United States Patent [19]

Zan

[11] Patent Number: 5,160,153

[45] Date of Patent: Nov. 3, 1992

[54] BARROW HAVING HIGH AND LOW POSITIONED WHEELS

[76] Inventor: Vunshik Zan, P.O. Box 55-1670, Taipei, Taiwan

[21] Appl. No.: 579,366

[22] Filed: Sep. 7, 1990

[51] Int. Cl.$^5$ ............................................. B62B 1/04
[52] U.S. Cl. ................................... 280/43.1; 280/47.2; 280/47.21; 280/47.27
[58] Field of Search ............... 280/47.16, 47.2, 47.21, 280/43.1, 47.27

[56] References Cited

U.S. PATENT DOCUMENTS

| | | | |
|---|---|---|---|
| 1,965,944 | 7/1934 | Lea | 280/47.21 |
| 2,607,606 | 8/1952 | Millen | 280/47.27 |
| 3,064,990 | 11/1962 | Salvucci | 280/47.2 |
| 4,550,924 | 11/1985 | Alber | 280/47.27 |

Primary Examiner—Andres Kasknikow
Assistant Examiner—Eric Culbreth

[57] ABSTRACT

A barrow includes a cart frame having a pair of front wheels rotatably mounted on a front or bottom portion of the frame, and a pair of middle wheels slidably mounted on a middle portion of the frame by a linkage pivotally connecting the frame and the middle wheels, whereby upon an erection of the frame, the middle wheels will be downwardly collapsibly folded; and upon a lay-down of the frame, the middle wheels will be slidably extended for evenly supporting a load carried on the frame in cooperation with the front wheels.

1 Claim, 3 Drawing Sheets

5,160,153

BARROW HAVING HIGH AND LOW POSITIONED WHEELS

BACKGROUND OF THE INVENTION

A conventional barrow such as carried by a porter includes a platform and two bottom wheels formed on a bottom portion of a cart, which may not climb stairs. If for running the barrow on a stiff slope, a gravity center of the barrow loaded by goods will be moved rearwardly towards a handle carried by the porter to heavily increase the burden of the porter.

The present inventor has found the drawbacks of a conventional barrow and invented the present barrow having front low wheels and middle high wheels for an easier handling of the barrow.

SUMMARY OF THE INVENTION

The object of the present invention is to provide a barrow including a pair of middle wheels formed on a middle portion of a cart frame and positioned lower than a pair of front wheels formed on a front or bottom portion of the frame, the middle wheels capable of sliding movement along a guide rail formed on the cart frame for a collapsible folding operation when vertically erecting the cart frame, and also for a rearward extension for stably supporting the cart frame when tilting the cart frame, so that the barrow when loaded with goods will be stably supported by the front and middle wheels, suitably for climbing a stiff slope or stairs.

BRIEF DESCRIPTION OF THE DRAWINGS

FIG. 4 shows a vertically erected barrow of the present invention.

DETAILED DESCRIPTION

Figure 1:
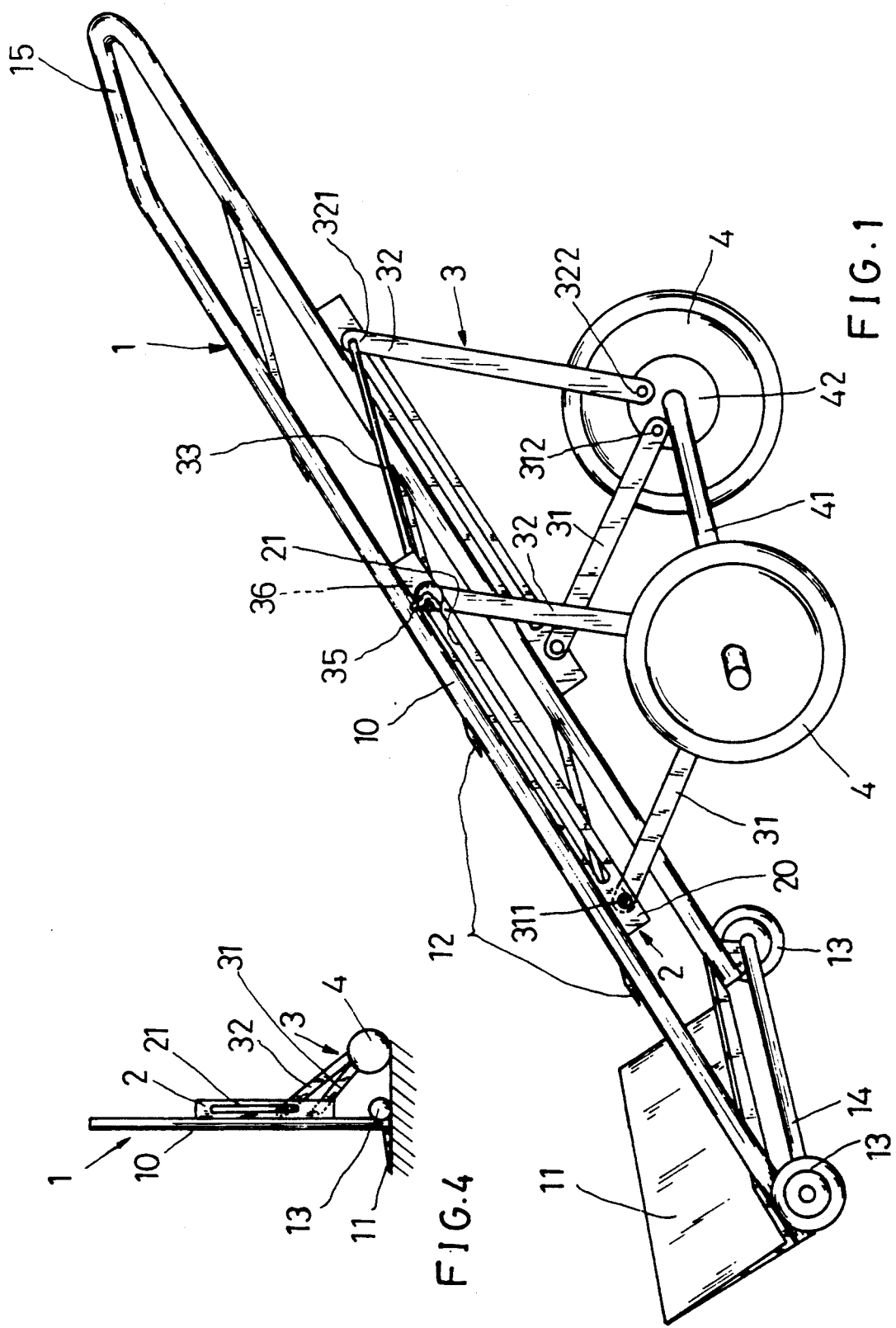
FIG. 1 is a perspective illustration of the present invention.
Figure 2:
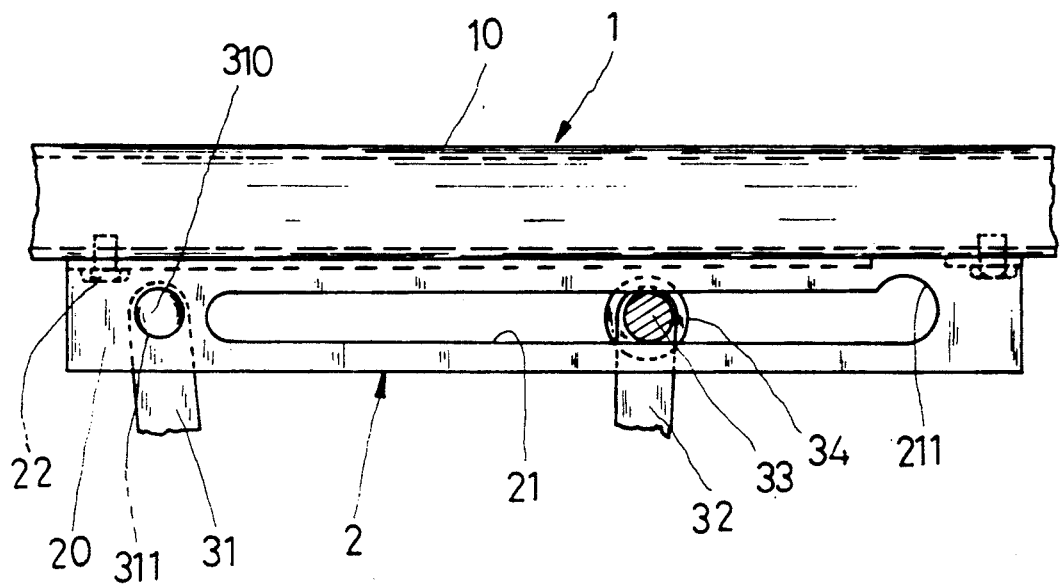
FIG. 2 shows a guide rail in cooperation with a supporting link means of the present invention.
Figure 3:
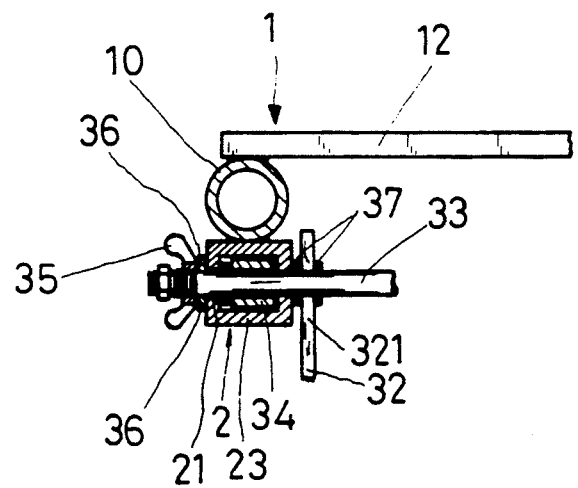
FIG. 3 is a partial sectional drawing of the guide rail coupled with a link of the present invention.

As shown in FIGS. 1-3, the present invention comprises: a cart frame 1, at least a guide rail 2 secured on the frame 1, and at least a middle wheel 4 rotatably mounted on a supporting link means 3 slidably retained on the guide rail 2.

The cart frame 1 includes two longitudinal columns 10 formed on a right and a left side of the frame 1, a base platform 11 formed on a bottom or front portion of the frame 1 generally perpendicular to the columns 10, two front wheels 13 rotatably mounted on a front axle 14 formed on a front or bottom portion of the frame 1, a plurality of pallets 12 transversely formed on the two columns 10, and a handle 15 formed on a rear or upper portion of the frame 1. The cart frame 1 and the wheels 13 also form the structure of a conventional barrow.

The guide rails 2 are respectively secured under the two columns 10 (at a middle portion of each column 10), each guide rail 2 having a longitudinal slot 21 formed in the rail 2 and a longitudinal groove 23 having a cross section of C shape. The rail 2 may be secured with the column 10 by welding or by screw 22 as shown in FIG. 2.

The supporting link means 3 includes a pair of front links 31, each front link 31 having its upper portion 311 pivotally secured to a front end portion 20 of the guide rail 2 by a pivot 310 and having its lower portion 312 pivotally secured to a disk 42 secured with a rear axle 41 having a pair of middle wheels 4 rotatably mounted on right and left sides of the axle 41, and a pair of rear links 32 each rear link 32 having its upper portion 321 pivotally secured to an upper shaft 33 slidably moving in each longitudinal slot 21 in the guide rail 2 and having a lower portion 322 pivotally secured to the disk 42. The two disks 42 are disposed on two opposite sides of the axle 41. The links 31, 32 may be formed inside or outside the guide rail 2.

Figure 5:
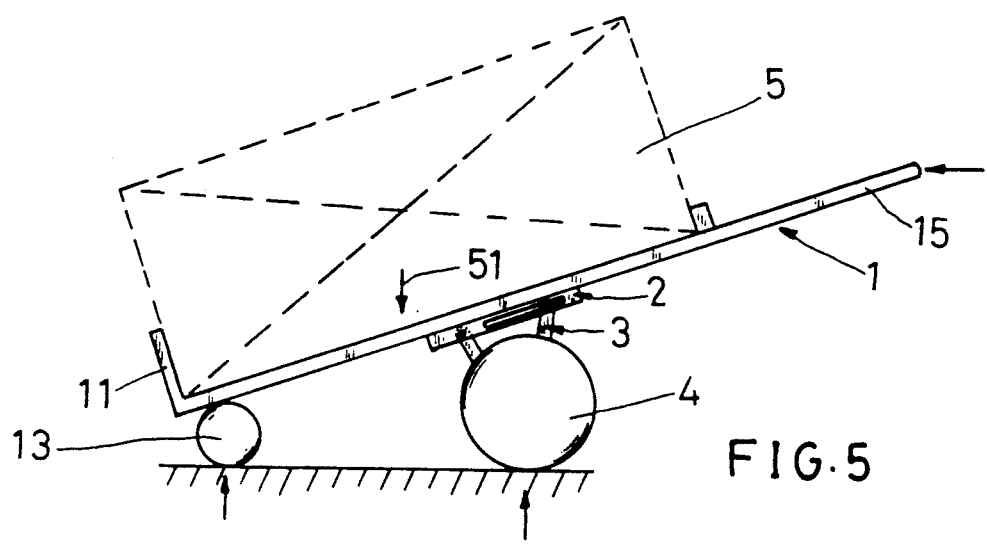
FIG. 5 shows the barrow of the present invention running on a flat ground.
Figure 6:
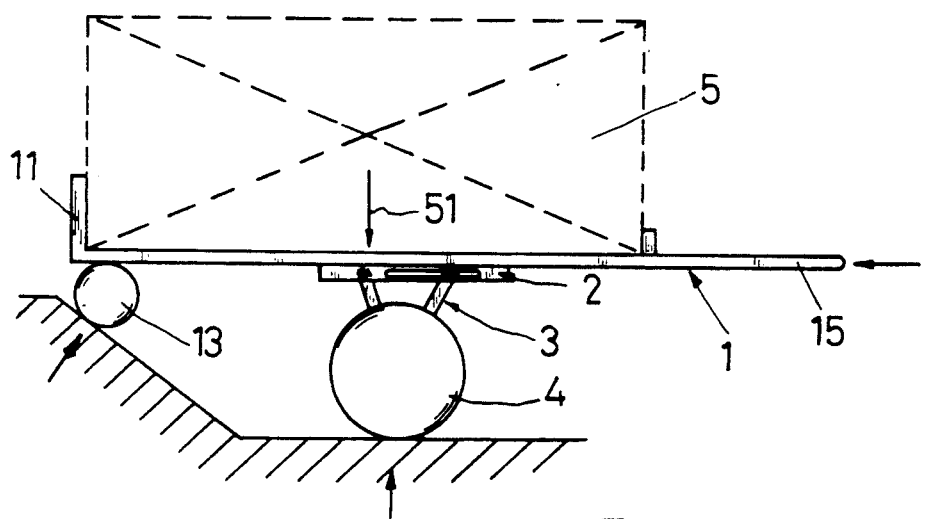
FIG. 6 shows the barrow of the present invention climbing on a slope surface.
Figure 7:
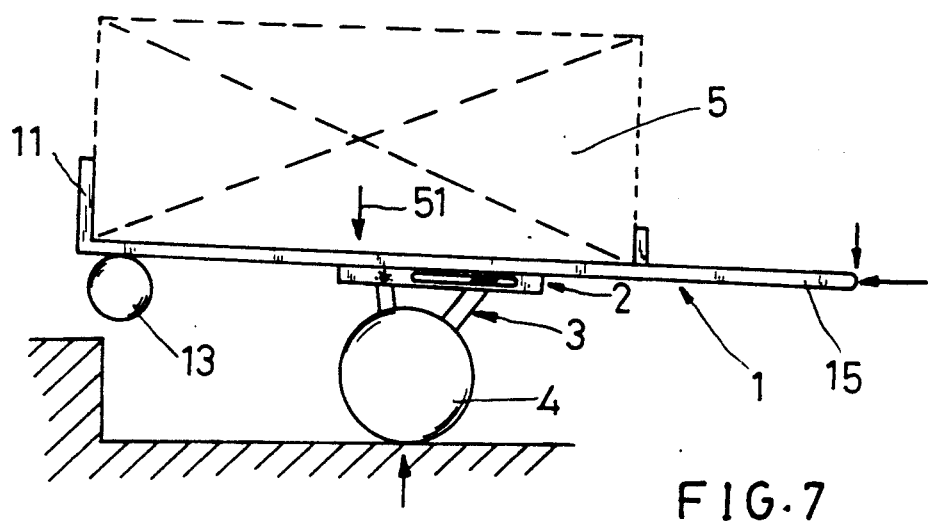
FIG. 7 shows the barrow climbing a stair in accordance with the present invention.

The upper shaft 33 has its outer end portion rotatably mounted with a roller 34 slidably rolling in the longitudinal groove 23 formed in the guide rail 2, and formed with male-threaded portion to be adjustably fixed on the rail 2 by a butterfly nut 35 or any adjusting nut as shown in FIG. 3 as retained by a limiting washer 36 between the nut 35 and the rail 2. Other retainer washers or bearing may be provided on the shaft 33 and roller 34 for a smooth sliding movement or pivotal operation of the link 32, shaft 33 and roller 34. On a rearmost end of the slot 21, there is formed with an enlarged socket 211 for firmly holding the shaft 33 when extending the link means 3 and middle wheels 4 from an erected position as shown in FIG. 4 to the laying-down position as shown in FIG. 5-7. Naturally, the nut 35 may be optionally locked on any desired position on the rail 2.

The middle wheels 4 are preferably two wheels, and may also be simplified to be a single wheel 4 rotatably secured in a V-shaped link means 3 which is also modified to be a single front link 31 and single rear link 32 (not shown). The front wheel 13 may be higher than the middle wheel 4 when depressing the handle 15 downwardly as shown in FIGS. 6 and 7, in which a lowest periphery of the front wheel 13 is higher than a lowest periphery of the middle wheel 4. A goods 5 loaded on the frame 1 of which the gravity center 51 is restricted in between the front wheel 13 and the middle wheel 4. Even when biasing the frame 1 downwardly to be horizontal as shown in FIG. 6, the gravity center 51 should also not be beyond the middle wheel 4.

When using the present invention for handling goods 5 loaded on the barrow, the vertically erected cart as shown in FIG. 4 is pulled downwardly to run the cart on a flat ground as shown in FIG. 5, in which gravity center 51 is limited to be in between the two wheels 13, 4. The middle wheels 4 will share the load from the goods 5 in cooperation with the front wheels 13 so as to save the burden loaded on a porter's or user's hands gripping the handle 15.

If for running the cart on a sloping surface as shown in FIG. 6, the gravity center 51 will be moved rearwardly to approximate to the middle wheel 4. In this circumstance, the front wheel 13 is higher than the middle wheel 4 to maintain the frame 1 to be generally horizontal so that the weight will not be inclined so rearwardly, without causing a very heavy burden to the porter or user.

For "climbing" a stair as shown in FIG. 7, the middle wheel 4 will serve as a fulcrum and by depressing the handle 15 downwardly to allow the front wheel 13 to pass over the stair, the cart can be continously pushed frontwardly without any obstruction.

The present invention is superior to a conventional barrow with the following advantages:

1. The front and middle wheels may help stabilize the loading of the barrow when running on a flat ground.
2. Since the front wheels 13 are positioned higher than the middle wheels 4, the present barrow can still climb a stiff slope or stairs.
3. The middle wheels 4 can be slidably adjustably fixed on the guide rails 2 fixed to the frame 1 so as to optionally adjust the tilting angle of the frame 1 from a ground level.

Even not in use, the frame 1 may be vertically erected as shown in FIG. 4, with the middle wheels 4 slid downwardly to a collasped state without affecting the balance of the cart.

I claim:

1. A barrow comprising:

a cart frame having a pair of longitudinal columns formed on right and left sides of said frame, a base platform formed on a bottom portion of said frame, a pair of front wheels formed on a lower portion of said frame, a plurality of pallets transversely formed on said columns, and a handle formed on an upper portion of said frame;

a pair of guide rails respectively secured under said pair of longitudinal columns of said frame;

a supporting link means slidably secured to said guide rails; and two middle wheels rotatably mounted on said supporting link means, a height of a lowest periphery of each said front wheel being higher than a height of a lowest periphery of each said middle wheel when said handle is operatively depressed downwardly to maintain said frame to be generally horizontal, said supporting link means and said middle wheels being operatively collapsed downwardly for folding purpose upon a vertical erection of said frame; said link means and said middle wheels being operatively slidably extended along said guide rails for evenly supporting a load carried on said frame when said frame is biased downwardly towards a ground where said wheels run;

said supporting link means including a pair of front links, each front link having an upper portion pivotally secured to a front portion of said guide rail and having a lower portion of said front link pivotally secured to a disk secured with an axle for rotatably mounting said middle wheel thereon, and a pair of rear links, each rear link having an upper portion pivotally secured with an upper shaft slidably moving in a longitudinal slot formed in said guide rail and having a lower portion of said rear link pivotally secured to said disk of said axle, said upper shaft having two opposite outer end portions rotatably mounted with two rollers slidably rolling in a longitudinal groove of said guide rail;

each said outer end portion of said upper shaft adjustably fixed on said rail by an adjusting nut; and said axle for rotatably mounting two said middle wheels thereon having two opposite sides of said axle respectively mounted with said two disks, each said disk having each said lower portion of each said front link and each said rear link pivotally secured to said disk.

* * * * *